United States Patent [19]

Youngblood

[11] 4,376,429
[45] Mar. 15, 1983

[54] ADAPTIVE CYLINDER BY CYLINDER KNOCK RETARD CONTROL

[75] Inventor: Ralph A. Youngblood, Livonia, Mich.

[73] Assignee: Ford Motor Company, Dearborn, Mich.

[21] Appl. No.: 276,605

[22] Filed: Jun. 23, 1981

[51] Int. Cl.³ .............................................. F02P 5/04
[52] U.S. Cl. ..................................... 123/425; 123/435
[58] Field of Search ................ 123/425, 435, 419, 436

[56] References Cited

U.S. PATENT DOCUMENTS

| | | | |
|---|---|---|---|
| 3,100,479 | 8/1963 | Wood | 123/425 |
| 3,757,755 | 9/1973 | Carner | 123/414 |
| 3,835,819 | 9/1974 | Anderson | 123/418 |
| 3,957,023 | 5/1976 | Peterson | 123/425 |
| 4,002,155 | 1/1977 | Harned et al. | 123/425 |
| 4,116,173 | 9/1978 | McDougal | 123/425 |
| 4,131,097 | 12/1978 | Sawada et al. | 123/117 R |
| 4,133,475 | 9/1979 | Harned et al. | 231/170 |
| 4,153,019 | 5/1979 | Laubenstein et al. | 123/117 R |
| 4,233,944 | 11/1980 | Omori | 123/425 |
| 4,243,007 | 1/1981 | Ehrhardt | 123/425 |
| 4,289,102 | 9/1981 | Katsumata | 123/425 |

Primary Examiner—Ronald B. Cox
Attorney, Agent, or Firm—Peter Abolins; Clifford L. Sadler

[57] ABSTRACT

This specification discloses an ignition timing system for an internal combustion engine wherein the spark timing for each cylinder is individually controlled to optimize the performance of each cylinder. Cylinder to cylinder variations in operating characteristics and ambient conditions can be taken into account while selecting a cylinder spark timing for improved torque and reduced knock.

1 Claim, 3 Drawing Figures

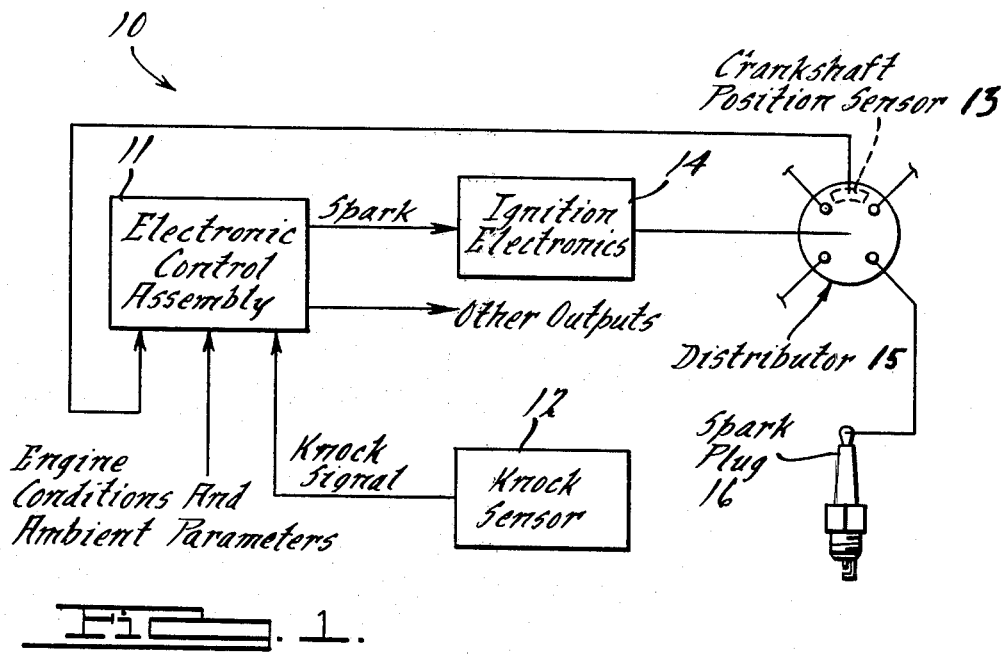
FIG. 1.
FIG. 3.
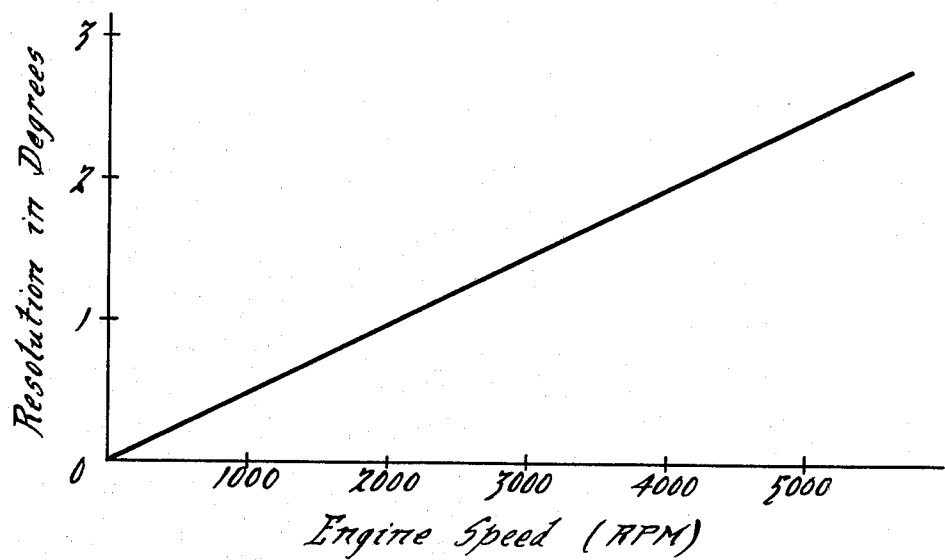

ADAPTIVE CYLINDER BY CYLINDER KNOCK RETARD CONTROL

BACKGROUND OF THE INVENTION

1. Field of the Invention

This invention relates to an ignition for an internal combustion engine wherein the ignition timing of an internal combustion engine is electronically computed and selectively adjusted as a function of engine knock.

2. Prior Art

Ignition timing of an internal combustion engine is varied in accordance with the operating conditions of the engine so that optimum operation of the engine is insured. It is generally known in the art that for increased efficiency and reduced fuel consumption of an engine the engine should be ignited with the minimum spark advance for best torque (MBT). Ignition timing of the engine must be varied in accordance with the engine operating conditions to ignite the engine at the MBT. It is also known that MBT is related to cylinder pressure as a function of crankshaft position angle. That is, when maximum cylinder pressure occurs at a certain desired crankshaft position angle, the cylinder is operating at MBT. The particular crankshaft position angle depends upon engine design parameters and occurs at a smaller spark angle advance than that where knocking begins.

Known ignition timing control systems establish the ignition timing of an engine by detecting the engine speed by a centrifugal advance mechanism and by detecting the intake vacuum pressure by a vacuum advance mechanism to represent the operating conditions of the engine. In recent years, there has been increased use of electronic circuitry in the operation of and control of internal combustion engines. For example, an electronic engine control can adjust the spark timing of an engine.

A disadvantage of the prior art systems is that since an ignition timing has been programmed on the basis of the test results of an internal combustion engine, there are instances where the ignition timing considerably deviates from the actual MBT. That is, the programmed ignition position differs from the actual ignition point due to the atmospheric conditions, variations in characteristics among engine of the same type, etc. Further, the adjustment of the spark timing is applied equally to all cylinders. Such an adjustment does not necessarily produce ignition of each cylinder at the MBT. Just as characteristics and operating conditions of entire engines vary, characteristics and operating conditions of individual cylinders in engines vary. These are some of the problems this invention overcomes.

SUMMARY OF THE INVENTION

In accordance with an embodiment of this invention, spark timing for each cylinder is individually controlled to optimize the performance of each cylinder. An electronic engine control computes an optimized spark advance based upon engine conditions and ambient parameters for all the cylinders. This general engine spark advance is modified for each cylinder by considering the knock history for each cylinder and the current spark timing for each cylinder. Such individual control strategy allows independent spark advance for each cylinder. The spark timing for each cylinder is adaptive to variations in air fuel ratio, deposit buildup, spark plug conditions, etc.

Cylinder to cylinder differences such as combustion rates, swirl rate, spark plug conditions, etc., cause each cylinder to have optimal performance (MBT) at different spark timing. For example, knock may occur at different spark timing for different cylinders. An engine control strategy that retards all cylinder's timing, if any one knocks, loses potential benefits by retarding the non-knocking cylinder's timing. An adaptive knock control system retards only the timing of the cylinders that knock, allowing maximum advance up to MBT, for each cylinder.

Operation in accordance with an embodiment of this invention improves overall engine operating efficiency through selected spark retard control strategy. In particular, the spark timing for each cylinder can be advanced by a predetermined fixed amount up to a fixed maximum limit as long as no knock occurs. If knock does occur, the maximum spark timing can be retarded by a predetermined fixed amount up to a fixed minimum limit.

BRIEF DESCRIPTION OF THE DRAWINGS

FIG. 1 is an overall system block diagram in accordance with an embodiment of this invention.

FIG. 3 is a graphical representation of the maximum spark timing resolution possible in accordance with one embodiment of this invention.

DETAILED DESCRIPTION OF THE INVENTION

Figure 2:
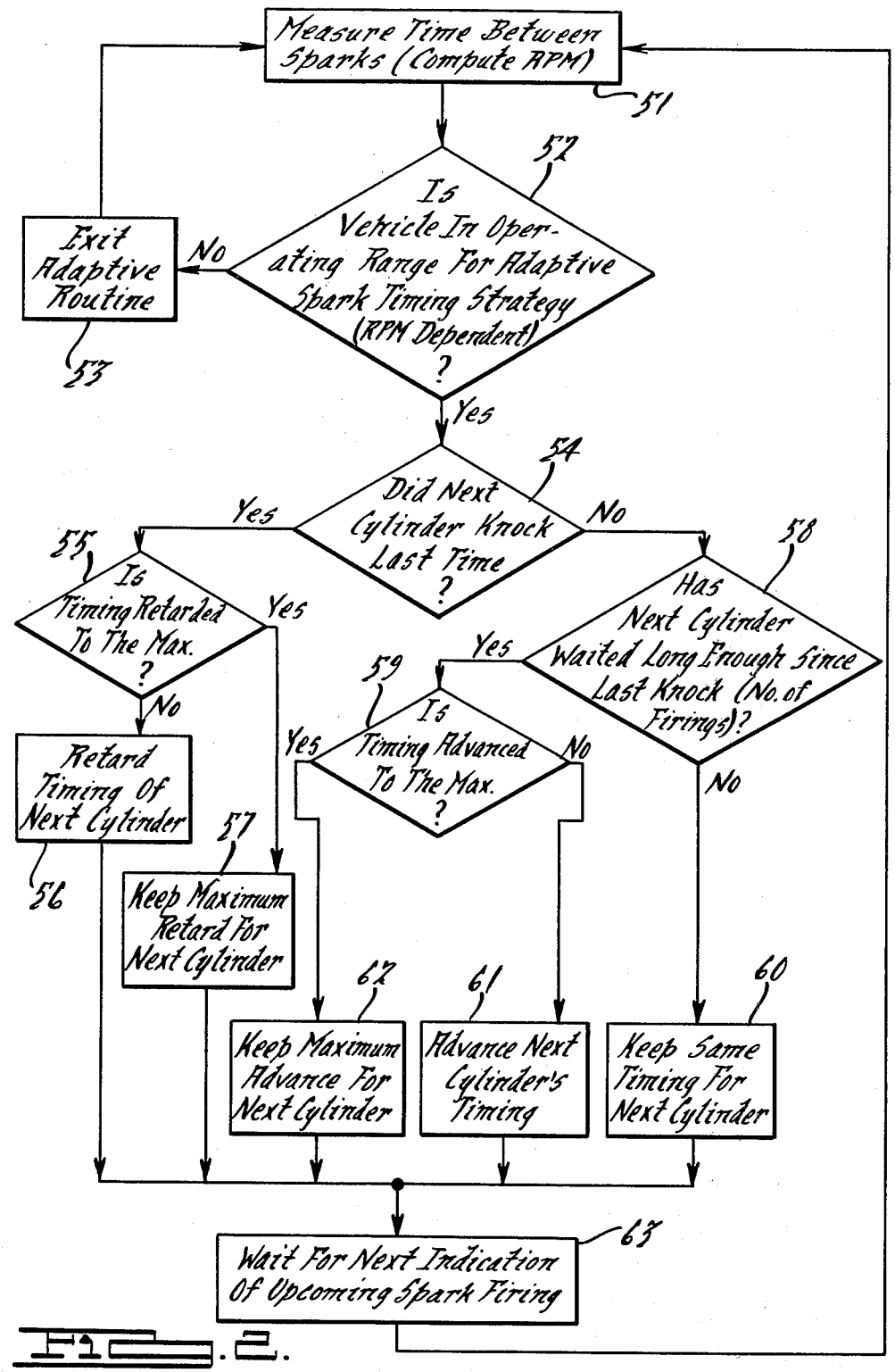
FIG. 2 is a logic flow block diagram in accordance with an embodiment of this invention.

Referring to FIG. 1, an adaptive cylinder by cylinder knock retard control system 10 includes an electronic control assembly 11 having an input from a knock sensor 12 and a crankshaft position sensor 13. A spark output from electronic control assembly 11 is applied to ignition electronics 14 which in turn applies a spark current to distributor 15. The spark current is selectively applied to one of a plurality of spark plugs 16 as distributor 15 rotates.

In operation, information about the knock history of each cylinder is detected by knock sensor 12 and stored in a memory in electronic control assembly 11. That is, after each cylinder is fired, the output of the knock sensor is correlated with that cylinder and stored as information about a particular cylinder in electronic control assembly 11. When electronic control assembly 11 prepares to fire the next cylinder in the sequence of cylinder firings, the stored history characterizing that next cylinder is examined in the memory of electonic control assembly 11 and a decision is made as to the spark timing to be applied to that next cylinder. Operation in accordance with an embodiment of this invention can provide advantageous improvements with respect to acceleration, octane requirements, fuel economy, emissions and drivability.

More particularly, each cylinder is characterized by an "advance/retard modifier". If no knock occurs for a certain interval of time, the advance/retard modifier is advanced by a specified amount up to a fixed maximum limit. The fixed maximum limit is predetermined as the minimum spark advance for best torque (MBT). Typically, the minimum spark advance is that at which cylinder pressure reaches a maximum at a desired crankshaft position angle. If knock does occur, the modifier is retarded by a certain amount down to a fixed minimum limit. If desired, closed loop control described above may revert to open loop control under conditions such as idle or very high engine RPM. Operation in accordance with an embodiment of this invention adjusts the spark timing of each individual cylinder independently, thus compensating for the fact that some cylinders knock more than others or have optimal performance at different spark advance angles.

Electronic control assembly 11 provides a central control for adaptive cylinder by cylinder knock retard control system 10. Assembly 11 monitors knock and engine operating conditions to establish a base spark timing for the engine. Such use of electronic circuitry in the operation and control of internal combustion engines is taught in U.S. Pat. No. 3,969,614 issued to Moyer et al. and assigned to the assignee hereof, the disclosure of which is hereby incorporated by reference. In addition, assembly 11 has a memory for storing the occurrence of knock associated with each cylinder and can predict when the next base spark firing will occur. Assembly 11 provides an output indicating an advance of a retard of the spark timing for each individual cylinder. The most recent spark timing advance or retard offset for each cylinder is also stored in assembly 11. This offset is correlated with the occurrence of any knocking to see if the spark timing for a cylinder can be advanced or must be retarded. The maximum spark resolution possible in a six cylinder engine using a typical control such as microcomputer 8748, with a six mega-hertz crystal is shown in FIG. 3.

Position sensor 13 provides an input to electronic control assembly 11 indicative of crankshaft position and therefore of the position of the piston within each of the cylinders. This is in contrast to known prior art systems, wherein sensor 13 would be connected to an ignition module to provide a triggering input. When electronic control assembly 11 receives an input from sensor 13 the input is converted to a digital signal and used by assembly 11 as the base timing reference. Corrections advancing or retarding the timing are applied to the base timing reference.

A typical knock sensor 12 includes a linear accelerometer and produces a sound wave of variable amplitude at a fixed frequency. The amplitude of the output varies with vibration and can be used to detect engine knock. Knock signal processing typically works on the principle that the amplitude of the sine wave from the knock sensor will increase when a knock occurs and will remain relatively constant under a non-knocking conditions. The constant amplitude signal is called background or engine noise. An increased signal is a knock burst. Electronic control assembly 11 samples engine noise at each spark firing and uses the sampled noise as a reference with which to compare subsequent samples and look for deviations that would indicate knock burst. If a knock burst occurs, a digital signal is produced within the electronic control assembly 11 for further processing.

Referring to FIG. 2, a simplified logic flow diagram for the operation of the electronic control assembly 11 is shown. Block 51 computes the RPM of the engine by measuring the time between sparks from information provided by the crankshaft position sensor 13. Block 52 evaluates the computed RPM to determine if the vehicle is in an operating range for the adaptive spark timing strategy. If the vehicle is not in the adaptive operating range, the logic flow goes to block 53 and there is no further use of the adaptive routine until the RPM is computed again. If the vehicle is in the operating range for the adaptive spark timing strategy, the logic flow diagram proceeds to block 54. At block 54, the information stored in the electronic control assembly 11 memory is interrogated to determine if the next engine cylinder to be fired knocked the last time firing occurred of that cylinder. If the answer is yes, block 55 inquires whether the spark timing of the next cylinder to be fired is retarded to the maximum amount. If the answer is no, the spark timing of the next cylinder to be fired is retarded. After retarding the timing at block 56, the strategy proceeds to block 63 where, at the occurrence of the next spark, the sequence starts again at block 51.

Retrurning to block 54, if the cylinder did not knock the last time as determined from the information stored in memory of electronic control assembly 11, the logic sequence proceeds to block 58. At block 58, the number of firings without knock is compared to a predetermined number. If the number of firings without knock exceeds that number, the logic goes to block 59. At block 59 the information in the memory of electronic control assembly 11 is interrogated to determine if the timing of the next cylinder to be fired is advanced to the maximum. If the timing is advanced to the maximum, the logic proceeds to block 62 where the maximum advance is kept for the next cylinder. If the timing is not advanced to the maximum, the logic proceeds to block 61 where the spark timing for the next cylinder is advanced. The path from both block 62 and 61 proceeds to block 63.

Returning to block 58, if the number of firings without knocking does not exceed the predetermined maximum, the logic proceeds to block 60. The action at block 60 is to keep the same spark timing for the next cylinder as with the previous firing of that cylinder. The logic sequence after block 60 proceeds to block 63.

Various modifications and variations will no doubt occur to those skilled in the various arts to which this invention pertains. For example, the particular knock sensor and electronic engine control may be varied from that disclosed herein. Further, a cylinder pressure signal can indicate the crank angle and be a direct measurement of whether or not spark timing is at, advanced, or retarded from MBT. Such an approach allows broader use of this cylinder by cylinder control technique. That is, using a knock signal for the cylinder by cylinder spark control technique is only advantageous in connection with those engines in which advancing the spark timing causes knock prior to reaching MBT. These and all other variations which basically rely on the teachings through which this disclosure has advance the art are properly considered within the scope of this invention as defined by the appended claims.

I claim:
1. A method for timing the ignition spark events of a spark ignited internal combustion engine in a manner to adaptively improve engine performance cylinder by cylinder comprising the steps of:
   detecting the crankshaft rotational position to determine the base timing for successive firings of each engine cylinder;
   adjusting the spark timing of each engine cylinder individually to improve cylinder performance sequentially, one cylinder at a time;
   detecting knocking of each of the individual engine cylinders;
   storing information describing the knock history of each individual cylinder in an electronic engine control assembly for modifying the timing of a spark applied to each engine cylinder in response to detection of knock associated with that cylinder;

said step of adjusting the spark timing for each cylinder including determining if the vehicle engine cranksahft revolution rate (RPM) is within a predetermined range;

determining if the engine cylinder next to fire knocked the last time it was fired and, determining the spark timing of the next to fire cylinder the last time it was fired;

determining whether the spark timing is retarded to the maximum if the next to fire cylinder did knock the last time;

retarding the timing of the next to fire cylinder if it is not retarded to the maximum and did knock last time and if the timing is retarded to the maximum then keeping the maximum retard for the next cylinder firing;

comparing the number of firings of the next to fire cylinder without knocking to a predetermined number;

keeping the timing for the spark for the next cylinder firing the same if the number of firings of the next to fire cylinder since the last knock is under the predetermined number;

determining whether the timing has advanced to the maximum if the number of firings of the next to fire cylinder without knock exceeds the predetermined number;

keeping the maximum advance for the next cylinder firing if the timing is advanced to the maximum and there have been no knocks in the predetermined number of firings of the next to fire cylinder;

advancing the spark timing of the next cylinder firing if the timing is not advanced to the maximum and the number of firings of the next to fire cylinder without knock exceeds the predetermined number; and said steps of retarding and advancing the spark advance timing are being accomplished in predetermined increments.

* * * * *